(12) United States Patent
Langer

(10) Patent No.: US 6,176,134 B1
(45) Date of Patent: Jan. 23, 2001

(54) FILLING LEVEL SENSOR

(75) Inventor: Martin Langer, Dortmund (DE)

(73) Assignee: Mannesmann VDO AG, Frankfurt am Main (DE)

(*) Notice: Under 35 U.S.C. 154(b), the term of this patent shall be extended for 0 days.

(21) Appl. No.: 09/207,711

(22) Filed: Dec. 9, 1998

(30) Foreign Application Priority Data

Dec. 9, 1997 (DE) .............................................. 197 54 521

(51) Int. Cl.$^7$ .................................................... G01F 23/32
(52) U.S. Cl. ................................................. 73/317; 73/315
(58) Field of Search .............................. 73/317, 305, 306, 73/307, 308, 313, 314, 1.31, 1.73, 454; 62/49.2; 338/86; 340/450, 450.2; 361/284; 422/106; 702/55; 95/24; 96/157, 158, 165, 247, 249, 250; 116/109, 110, 227, 228, 229; 137/192, 202, 397, 388, 434, 558

(56) References Cited

U.S. PATENT DOCUMENTS 4,671,121 * 6/1987 Schieler .................................. 73/317
4,924,704 * 5/1990 Gaston ................................... 73/317
5,140,303 * 8/1992 Meyer ............................... 340/450.2
5,333,499 * 8/1994 Gaston ................................... 73/317
5,341,679 * 8/1994 Walkowski et al. ................... 73/317

FOREIGN PATENT DOCUMENTS 4438332  5/1996  (DE) .
4300383  7/1996  (DE) .

* cited by examiner

Primary Examiner—Harshad Patel
(74) Attorney, Agent, or Firm—Mayer, Brown & Platt

(57) ABSTRACT

A filling level sensor for generating electrical signals as a function of the filling level, in which a regulator is integral to a guider of a carrier part, (6). An actuator of the regulator is connected to a mounting arm. (9) via a coupling element (8). As a result, the mounting arm (2) can bend transversely with respect to its direction of movement without the actuator (9) lifting off from a fixed resistor network (7) of the regulator (5).

18 Claims, 2 Drawing Sheets

FILLING LEVEL SENSOR

FIELD OF THE INVENTION

The invention relates to a filling level sensor for generating electrical signals as a function of a filling level of a fluid in a container, said sensor having a bracket which is pivotably mounted on a carrier part and which can be deflected by a float for the purpose of moving an actuator of a regulator which is designed to generate the electrical signals.

BACKGROUND OF THE INVENTION

In motor vehicles today such filling level sensors are used, for example, to determine a filling level of fuel in a fuel container, and are known from practice. Here, the mounting arm is fabricated in two parts with a bracket fabricated from plastic and a lever wire for holding a float. The regulator is designed, for example, as a potentiometer with a sliding track which is arranged on the carrier part, or as a magnetically active position sensor having a resistor network which is arranged on the carrier part. The actuator of the regulator is usually attached to the bracket and, depending on the shape of the regulator, either has a sliding contact or a magnet. In order to ensure a constant prestress of the actuator or a constant distance between the actuator and the regulator components arranged on the carrier part, the mounting arm has two axial guides. As a result, forces transmitted from the float to the mounting arm are supported by the axial guides.

A disadvantage with the known filling level sensor is that it is of structurally very complex design as a result of the axial guides. In addition, because of the tolerances of the guides and of the mounting arm, in the known filling level sensor, the prestress of the actuator or the distance of the actuator can be kept constant only inadequately. As a result of forces acting on the mounting arm via the float, the mounting arm can tilt between the two guides so that the prestress of the actuator or the distance between the actuator and the components arranged on the carrier part is also changed.

SUMMARY OF THE INVENTION

The invention is based on the problem of designing a filling level sensor of the type mentioned at the beginning in such a way that it is constructed in a particularly simple way and prevents as reliably as possible a change in the prestress of the actuator or the distance between the actuator and the regulator components which are arranged on the carrier part.

This problem is solved according to the invention by virtue of the fact that the actuator is arranged in a guide of the carrier part.

By virtue of this design, the mounting arm does not require any complex guide on the carrier part. As a result, the filling level sensor according to the invention is constructed in a particularly simple way. The bracket and the carrier part can therefore be fabricated very easily, for example from plastic using the plastic injection molding method. The guide of the actuator may additionally be made significantly smaller, and therefore also lower in friction than the guides for the mounting arm. Furthermore, thanks to the invention, tilting movements of the mounting arm no longer lead to a change in the prestress of the actuator or in the distance between the actuator and the regulator components arranged on the carrier part. Therefore, the mounting arm may be guided by the carrier part in a very loose way.

The actuator could, for example, be moved by a magnet arranged on the mounting arm. However, arranging a coupling element between the mounting arm and the actuator helps to reduce the costs of the filling level sensor according to the invention.

According to another advantageous development of the invention, vibrations are not transmitted to the actuator of the regulator if the coupling element has a damping element. Furthermore, forces transmitted from the mounting arm to the coupling element do not lead to tilting of the actuator in the guide.

The filling level sensor according to the invention can be mounted particularly easily if the coupling element is arranged perpendicular to the direction of movement of the actuator and is designed so as to be capable of sliding into itself telescopically.

The actuator follows a change in the mounting arm virtually without delay and can additionally be mounted very easily if the coupling element has a latching connection for attachment to a lever wire which has a round cross section and supports the float.

The filling level sensor according to the invention is of particularly cost-effective design if the actuator is arranged on a mounting part which is displaceable in the guide of the carrier part. As a result, the mounting part may be fabricated, for example, from plastic using the plastic injection molding method while the actuator, which usually has to be manufactured in a complex fashion, has a particularly small dimension.

According to another advantageous development of the invention, tilting of the actuator or of the mounting part in the guide of the carrier part is reliably avoided if the coupling element is mounted on the mounting part so as to be capable of pivoting about an axis which is arranged transversely with respect to the direction of movement of the actuator.

A further contribution to reducing the fabrication costs of the filling level sensor according to the invention is made if the mounting part has laterally protruding bolts which penetrate the guide of the carrier part and have a round cross section. In this context, the mounting part may be fabricated in one piece with the coupling element and pivot in the guide when the mounting arm moves away.

The filling level sensor according to the invention may have very large tolerances without the actuator or the mounting part tilting in the guide if the coupling element has a ball joint for attachment to the mounting arm and/or to the mounting part. As a result of this design it is, for example, no longer necessary for the guide on the carrier part for the actuator to be designed to correspond to the pivot radius of the mounting arm. As a result, the regulator can, for example, also have a straight sliding track or be mounted obliquely on the carrier part.

DESCRIPTION OF THE DRAWINGS

The invention permits numerous embodiments. In order to clarify its basic principle further, a plurality of said embodiments are illustrated in the drawing and described below. In said drawing

DETAILED DESCRIPTION OF THE PREFERRED EMBODIMENTS

Figure 1:
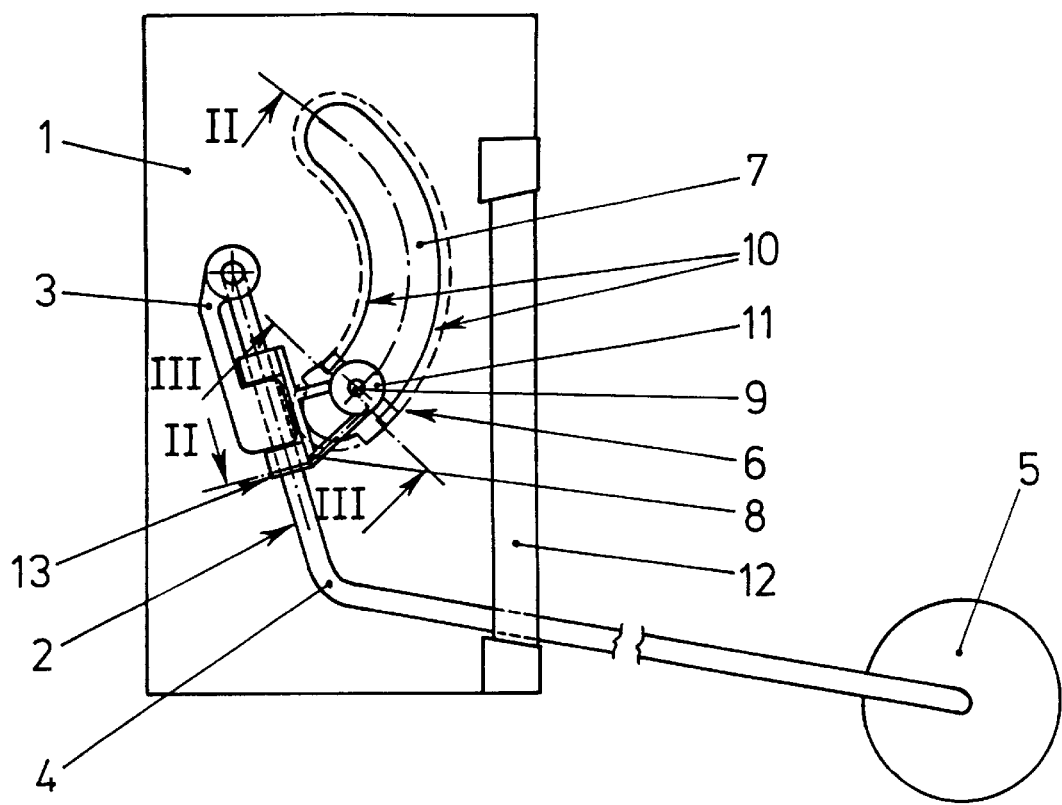
FIG. 1 is a schematic illustration of a filling level sensor according to the invention in a plan view.

FIG. 1 shows a schematic, plan view of a filling level sensor according to the invention. The filling level sensor has a carrier part 1 on which a mounting arm 2 is pivotably mounted. The mounting arm 2 has a bracket 3 to which a lever wire 4 with a float 5 is attached. The filling level sensor may be mounted, for example, on a vertical wall (not illustrated) of a fuel container of a motor vehicle. The position of the float 5 which follows the level of the fuel is sensed by a regulator 6 which generates electrical signals as a function of the adjustment angle of the mounting arm 2. The regulator 6 is designed as a magnetically active position sensor and has a resistor network 7 which is attached to the carrier part 1 and by means of which an actuator 9, which is attached to the mounting arm 2 by means of a coupling element 8 and is designed as a magnet, is moved. The actuator 9 is arranged on a mounting part 11 which is displaceable in a guide 10, designed as a T-shaped groove, of the carrier part 1. Furthermore, the lever wire 4 is guided by an apron 12 of the carrier part 1, as a result of which particularly large bending forces are supported transversely with respect to the direction of movement of the mounting arm 2.

In the case of forces which are transmitted from the float 5 to the mounting arm 2, the mounting arm 2 can be bent away from the carrier element 1. The actuator 9 remains here in the guide 10 of the carrier part 1, as a result of which a constant distance between the actuator 9 and the resistor network 7 is ensured. The apron 12 can be kept at a distance from the lever wire 4 so that no friction occurs at this point.

Figure 2:
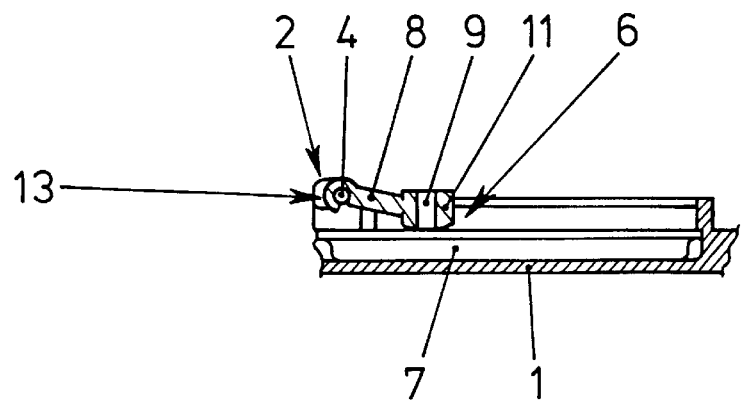
FIG. 2 shows a sectional view through the filling level sensor from FIG. 1 along the line II—II.

FIG. 2 shows the filling level sensor according to the invention from FIG. 1 in a sectional view along the line II—II through the regulator 6 and the mounting part 11 of the actuator 9. Furthermore, FIG. 2 shows that the lever wire 4 has a round cross section. The coupling element 8 is fabricated in one piece with the mounting part 11 and is attached to the lever wire 4 by means of a latching connection 13. As a result, the coupling element 8 is pivotably mounted on the lever wire 4. Furthermore, the mounting part 11 has a round shape in its region bearing against the resistor network 7. When the lever wire 4 is bent away from the carrier part 1, this shape enables the mounting part 11 to pivot in the guide 10. The mounting part 11 is thus reliably prevented from becoming clamped in the guide 10.

Figure 3:
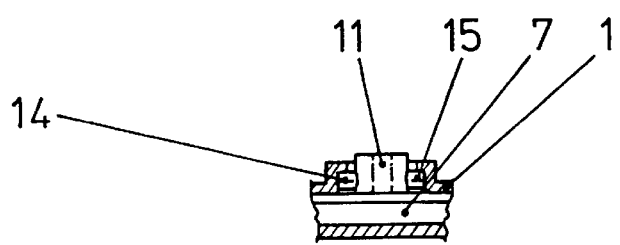
FIG. 3 shows a sectional view through the filling level sensor in FIG. 1 along the line III—III.

FIG. 3 shows the mounting part 11 from FIG. 1 in a sectional view along the line III—III. The mounting part 11 has laterally protruding bolts 14, 15 behind which the T-shaped guide 10 of the carrier part 1 engages.

Figure 4:
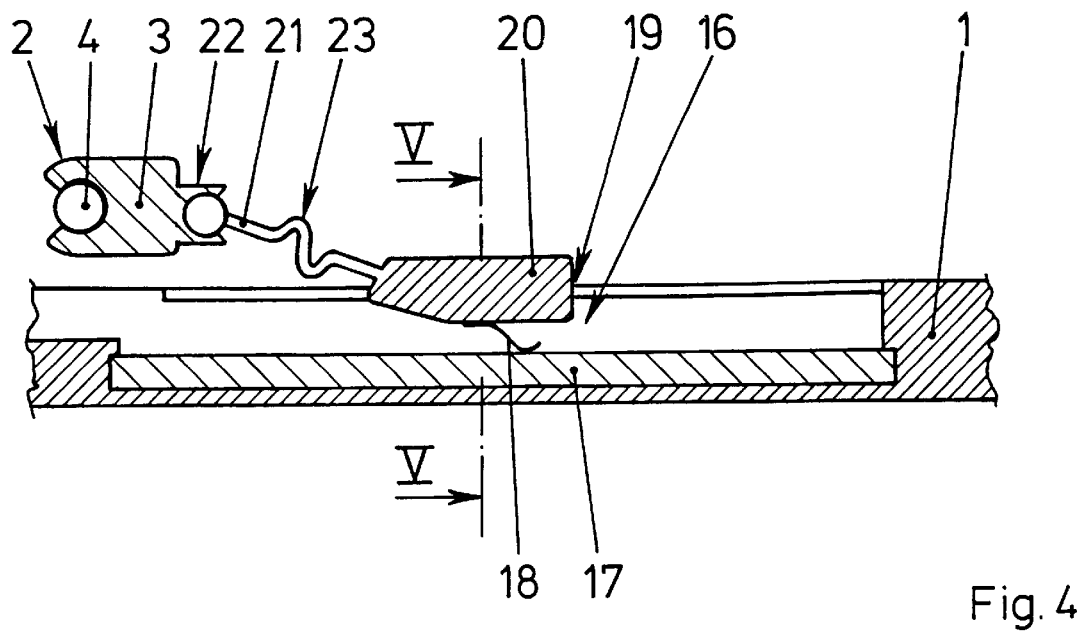
FIG. 4 shows a further embodiment of the filling level sensor according to the invention, in a longitudinal section through a regulator.

FIG. 4 shows a further embodiment of the filling level sensor according to the invention in a sectional view through a regulator 16 and the mounting arm 2. The regulator 16 is designed here as a potentiometer and has a resistor sliding track 17 arranged on the carrier part 1. An actuator 18 which is designed as a sprung sliding contact and is attached to a mounting part 20 guided in a guide 19 of the carrier part 1 slides over the resistor sliding track 17. The mounting part 20 is fabricated in one piece with a coupling element 21 which is connected to the bracket 3 of the mounting arm 2 via a ball joint 22. The coupling element 21 forms a damping element 23 by virtue of an elastic S-shape in its central region. This damping element 23 prevents vibrations and sharp knocks from being transmitted to the actuator 18.

Figure 5:
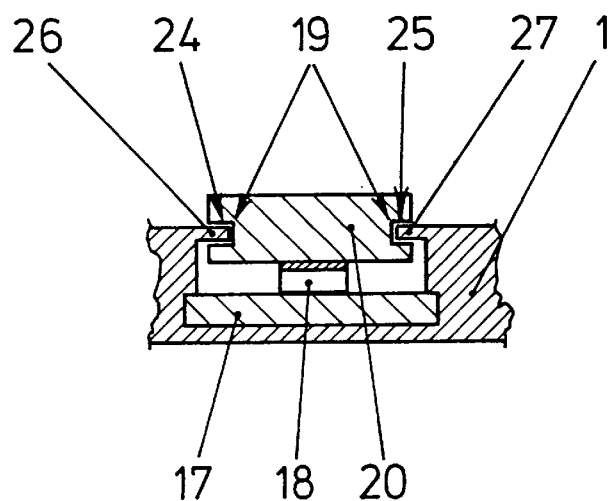
FIG. 5 shows a sectional view through the filling level sensor from FIG. 4, along the line V—V.

FIG. 5 shows a sectional view along the line V—V from FIG. 4 of the guide 19 of the carrier part 1 for the mounting part 20. The guide 19 has protruding webs 26, 27 which penetrate grooves 24, 25 of the mounting part 20. As a result, it is not possible for the actuator 18 to be pressed against the resistor sliding track 17 or be lifted off from it. The actuator 18 thus has a constant prestress against the resistor sliding track 17.

Figure 6:
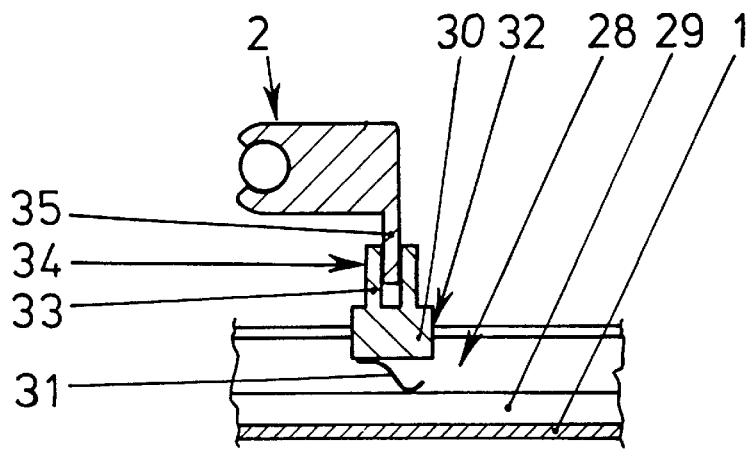
FIG. 6 shows a sectional view through the regulator of a further embodiment of the filling level sensor according to the invention.

FIG. 6 shows a further embodiment of the filling level sensor according to the invention in a sectional view through a regulator 28 with a resistor sliding track 29 attached to the carrier part 1, and the mounting arm 2. The regulator 28 has an actuator 31 which is attached to a mounting part 30 and is designed as a sprung sliding contact. The mounting part 30 is, like the one in FIG. 4, displaceably arranged in a guide 32 of the carrier part 1. On its side turned away from the actuator 31, the mounting part 30 has a U-shaped under part 33 of a coupling element 34 which is penetrated by a rod-shaped upper part 35, fabricated in one piece with the mounting arm 2, of the coupling element 34. Which allows rod shaped upper part to slide telscopically into U-shaped part 33.

What is claimed is:

1. A filling level sensor for generating electrical signals as a function of a filling level of a fluid in a container comprising: a mounting arm which is pivotably mounted on a carrier part and which is deflected by a float attached to the mounting arm for the purpose of moving an actuator of a regulator which is designed to generate electrical signals, wherein the actuator (9, 18, 31) is arranged in a guide (10, 19, 32) having a bottom portion integral to the carrier part (1) wherein the regulator is attached to the bottom portion of the guide, and the actuator contacts the regulator within the guide.

2. The filling level sensor of wherein a coupling element (8, 21, 34) is arranged between the mounting arm (2) and the actuator (9, 18, 31).

3. The filling level sensor of claim 2, wherein the coupling element (21) has a mechanical damping element (23).

4. The filling level sensor of claim 2, wherein the coupling element (34) is arranged orthogonal to the plane of movement of the actuator (31) and is designed so as to be capable of sliding into itself.

5. The filling level sensor of claim 2, wherein the mounting arm has a lever wire which has a round cross section and supports the float (5) and wherein the coupling element (8) has a latching connection (13) attached to the lever wire (4) of the mounting arm.

6. The filling level sensor of claim 2, wherein the actuator (9, 18, 31) is arranged on a mounting part (11, 20, 30) connected to the mounting arm, said mounting part displaceable in the guide (10, 19, 32) of the carrier part (1).

7. The filling level sensor of claim 6, wherein the mounting part (11) has laterally protruding bolts (14, 15) which penetrate the guide (10) of the carrier part (1) and have a round cross section.

8. A filling level sensor for producing electrical signals as a function of the fluid level of a container comprising:

a carrier part having a guide;

the guide having a bottom portion;

a mounting arm pivotably mounted on the carrier part;

a float attached to the mounting arm which deflects the mounting arm;

a regulator attached to the bottom portion of the guide of the carrier part; and an actuator slidably engaged with the regulator, moveable by the mounting arm and moveable in the guide, wherein the regulator generates electrical signals representative of the position of the actuator in the guide and the actuator contacts the regulator within the guide.

9. The filling level sensor of claim 8, further comprising a coupling element which connects the mounting arm and the actuator.

10. The filling level sensor of claim 9, wherein the coupling element has a mechanical damping element.

11. The filling level sensor of claim 9, wherein the coupling element is arranged orthogonally to the plane of movement of the actuator and is slidable into itself.

12. The filling level sensor of claim 9, wherein the mounting arm has a lever wire having a round cross section and which supports the float and wherein the coupling element has a latching connection attached to the lever wire of the mounting arm.

13. The filling level sensor of claim 9, wherein the actuator is arranged on a mounting part connected to the mounting arm, said mounting part displaceable in the guide of the carrier part.

14. The filling level sensor of claim 13, wherein the mounting part has laterally protruding bolts of round cross section which engage the guide of the carrier part.

15. A filling level sensor for producing electrical signals as a function of the fluid level of a container comprising:

a carrier part having a guide;

a mounting arm pivotably mounted on the carrier part;

a float attached to the mounting arm which deflects the mounting arm;

a regulator attached to the guide of the carrier part; and an actuator slidably engaged with the regulator, moveable by the mounting arm and moveable in the guide, wherein the regulator generates electrical signals representative of the position of the actuator in the guide;

a mounting part connected to the mounting arm, said mounting part displaceable in the guide of the carrier part, wherein the actuator is arranged on a mounting part;

a coupling clement which connects the mounting arm and the actuator, wherein the coupling element is mounted on the mounting part and the coupling element pivots about an axis which is arranged perpendicularly with respect to the direction of movement of the actuator, within the plane defined by that movement.

16. The filling level sensor of claim 15, wherein the mounting part has laterally protruding bolts of round cross section which engage the guide of the carrier part.

17. A filling level sensor for producing electrical signals as a function of the fluid level of a container comprising:

a carrier part having a guide;

a mounting arm pivotably mounted on the carrier part;

a float attached to the mounting arm which deflects the mounting arm;

a regulator attached to the guide of the carrier part; and an actuator slidably engaged with the regulator, moveable by the mounting arm and moveable in the guide, wherein the regulator generates electrical signals representative of the position of the actuator in the guide;

a mounting part connected to the mounting arm, said mounting part displaceable in the guide of the carrier part, wherein the actuator is arranged on a mounting part;

a coupling element which connects the mounting arm and the actuator, wherein the coupling element has a ball joint attached to the mounting arm.

18. The filling level sensor of claim 17, wherein the mounting part has laterally protruding bolts of round cross section which engage the guide of the carrier part.

* * * * *